United States Patent [19]

Benard

[11] Patent Number: 4,563,206

[45] Date of Patent: Jan. 7, 1986

[54] APPARATUS FOR TEMPERING GLASS SHEETS SUSPENDED IN A VERTICAL ORIENTATION

[75] Inventor: Claude Benard, Croissy Sur Seine, France

[73] Assignee: Saint-Gobain Vitrage, Courbevoie, France

[21] Appl. No.: 586,982

[22] Filed: Mar. 7, 1984

[30] Foreign Application Priority Data

Mar. 10, 1983 [FR] France ............................... 83 03918

[51] Int. Cl.⁴ ................................................ C03B 27
[52] U.S. Cl. ........................................ 65/348; 65/104; 65/114; 65/351
[58] Field of Search ................. 65/104, 114, 348, 351, 65/111

[56] References Cited

U.S. PATENT DOCUMENTS

| | | | |
|---|---|---|---|
| 2,369,368 | 2/1945 | Paddock et al. | 65/348 |
| 3,346,360 | 10/1967 | O'Connell et al. | 65/104 X |
| 4,157,910 | 6/1979 | Ionler | 65/114 X |

Primary Examiner—Arthur Kellogg
Attorney, Agent, or Firm—Pennie & Edmonds

[57] ABSTRACT

Apparatus is disclosed for tempering curved glass sheets suspended in a vertical orientation. The apparatus comprises a pair of opposed manifolds each having a plurality of nozzles and positional adjustment means to optimize the heat exchange effect between the tempering station and the sheet of glass. A first adjustment means adjusts the orientation of the manifold with respect to the surface of the glass by means of four independently adjustable screw jacks that mount the manifold on a frame. A second adjustment means adjusts the horizontal spacing between the manifold and the surface of the glass by means of four screw jacks that operate in unison. In addition, another displacement means permits the manifold to be displaced from its tempering position to facilitate the insertion and removal of the glass sheets between the two manifolds. Advantageously, the displacement means is mounted on the second adjustment means.

8 Claims, 1 Drawing Figure

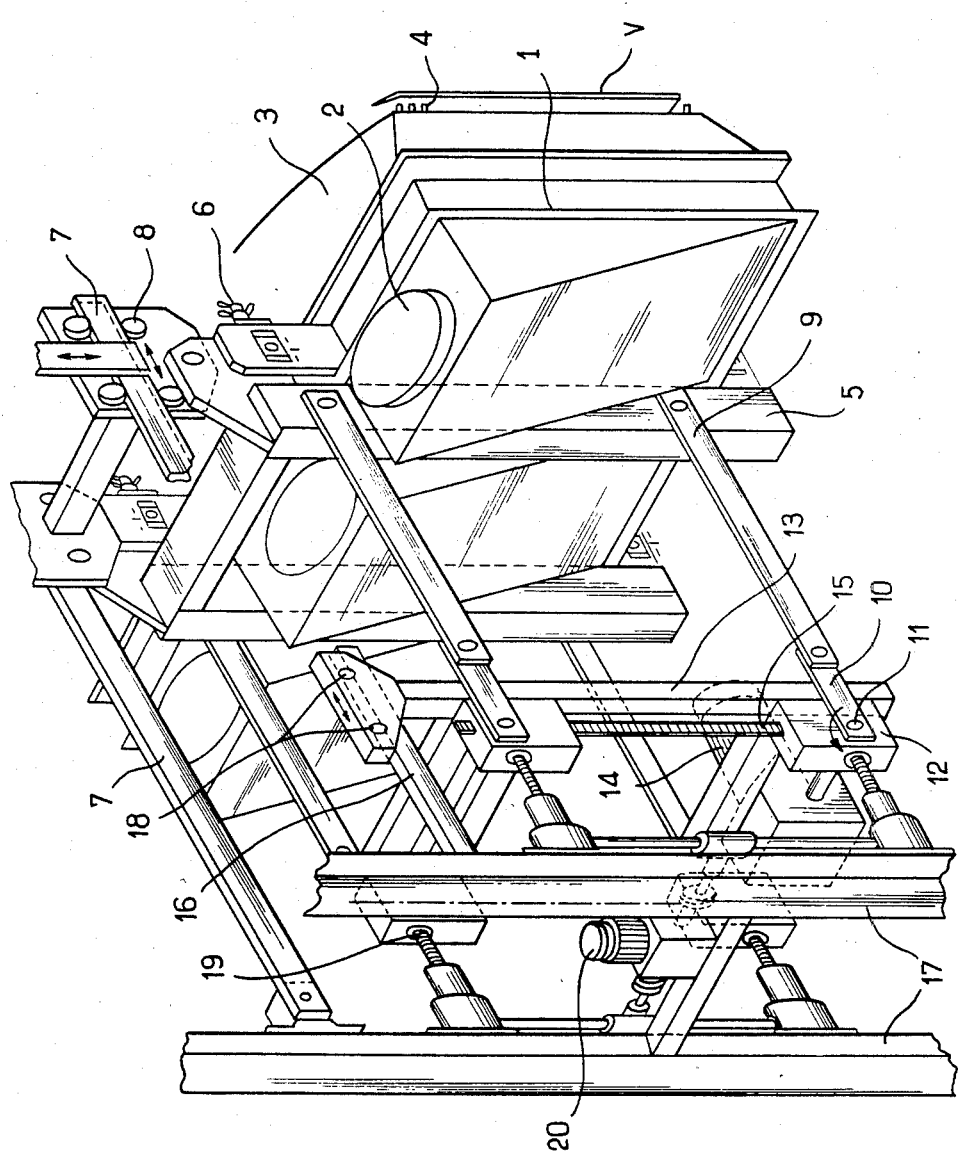

APPARATUS FOR TEMPERING GLASS SHEETS SUSPENDED IN A VERTICAL ORIENTATION

BACKGROUND

This relates to apparatus for tempering glass sheets suspended in a vertical orientation and, in particular, to such apparatus that can readily accommodate changes in the size, shape and pattern of the sheets to be tempered.

The basic process of tempering glass is old and well known. Such process comprises heating a glass sheet above its annealing temperature and then rapidly cooling the surfaces of the glass sheet to set the latter while the center is still hot. This action provides glass sheets with a stress pattern in which the surface of the glass is stressed in compression and the center portion is stressed in tension.

A surface stressed in compression makes the sheet much stronger than untempered glass because glass is better able to withstand external forces when it is stressed in compression than when it is stressed in tension. Moreover, when the outer surface or compression skin of tempered glass is penetrated, the tension stresses within the glass cause it to shatter into a large number of relatively harmless, smoothly surfaced pieces. In contrast, annealed glass is fractured more easily, and when fractured, breaks into relatively dangerous, large, uneven jagged fragments.

In conventional glass tempering operations, the glass sheet is heated close to its melting point, and then quickly quenched by uniformly exposing the opposite surfaces of the heated glass sheets to streams of a fluid or gas, such as air, arranged to cool both surfaces uniformly and simultaneously. Typically, the fluid or gas is dispensed through two sets of nozzles, one set facing one surface of the curved glass and the other facing the opposite surface of the glass.

In the treatment of glass, it is desirable to assure uniform tempering of glass to avoid an uneven stress pattern in the compression skin. If unevenly tempered glass is fractured, this uneven stress pattern causes jagged fragments of glass which are more dangerous than the smoothly surfaced, uniform fragments of a broken sheet of uniformly tempered glass. In addition, unevenly tempered glass causes patterns of iridescence to form on the surface of the glass which are very annoying when viewed in reflection.

To temper glass uniformly, the cooling air must be evenly distributed on the glass surfaces. In conventional apparatus for tempering glass, this is accomplished by blasting air into an air distribution box and out through a plurality of uniformly spaced, elongated nozzles which are located a uniform distance from the adjacent glass sheet. To provide a uniform distance between the box and the sheet, the air distribution box has a fixed curved surface facing the glass sheet which has a shape conforming to that of a particular high production pattern of glass sheet. Unfortunately, such apparatus does not have the structural flexibility to provide uniform quenching of dimensionally varying glass of a particular pattern which may result, for example, from variations in the glass making process.

In current machines for tempering glass sheets mounted in a vertical orientation, the air distribution boxes ordinarily are mounted so that they only can move in a horizontal direction toward or away from the sheet of glass and cannot be oriented with respect to the precise vertical position of the glass sheet. Frequently, the curvature of the glass sheets, particularly those having multiple curvatures, is such that the sheet is not always suspended in an exactly vertical position; and there are variations from sheet to sheet in the angle of inclination of the sheets from the vertical. As a result, horizontal movement of the air distribution box does not make it possible to assure a uniform distance between the nozzles on the opposed air distribution boxes and the surfaces of the glass sheet between them. Consequently, there is an irregularity in the tempering of the glass, with the areas closest to the nozzles exeriencing more tempering. As a result, to assure sufficient tempering of the entire surface of a glass sheet, it is necessary to use more tempering gas or fluid to assure that all portions of the glass sheet are sufficiently tempered, with a resulting increase in operating cost and variations in the amount of tempering.

These problems are particularly acute when tempering glass as thin as three millimeters or less. For thicker glass, it is possible to position the nozzles at relatively large distances from the glass, so that deviations in the separation between the nozzles and the glass surface are not very bothersome. However, for glass as thin as three millimeters or less, the distances between the nozzles and the glass are considerably smaller, the blowing pressures are greater, and any variations in the separation between the nozzles and the glass produce much greater irregularities in tempering and in some instances make it impossible.

SUMMARY

In the present invention, I have devised an apparatus for tempering glass sheets suspended in a vertical orientation which provides positional adjustment means to optimize the heat exchange effect between the tempering station of the apparatus and the sheet of glass. In accordance with my invention, the apparatus comprises two tempering stations mounted on structural supports that permit the tempering stations to be moved horizontally so as to permit insertion and removal of a glass sheet between them and means for adjusting the position of the nozzles relative to the surfaces of the glass sheets.

Each tempering station comprises a blowing means having a manifold having a curved outer surface which conforms to the spatial configuration of the glass sheet to be tempered and a plurality of nozzles mounted on the curved surface. Screw jacks mount the blowing means on the spaced uprights of a carrier frame to provide means for adjusting the orientation of the blowing means with respect to the surface of the glass to be tempered. By turning the screw jacks, the orientation of the curved outer surface can be varied so that it conforms more closely to the angle of inclination of the surface of the glass.

In addition, the carrier frame is mounted on a carriage that can be moved in a horizontal direction on two spaced apart beams. Advantageously, the carriage can be moved horizontally by two different adjusting means. The first permits each tempering station to be displaced from the tempering position to facilitate the insertion and removal of the glass sheets between the tempering stations. This device comprises rotatable rods attached at one end to the carrier frame of the tempering station, a crank attached to the other end of each rod and a gearing arrangement to rotate the cranks in unison. When the gear rotates the cranks, the cranks cause the rotatable rods to displace the carrier frame along the length of the tracks. As a result, the carrier frame may be moved without disrupting other adjustments previously made to the orientation of the tempering station. The second adjusting means provides for adjustment of the horizontal spacing between each tempering station and the surface of the glass. This device comprises a mobile chassis on which are mounted the cranks that control the position of the tempering station, a plurality of screw jacks for changing the position of the mobile chassis and a gear for driving the screw jacks in unison.

DESCRIPTION OF PREFERRED EMBODIMENT

As shown in the drawing, a preferred embodiment of the apparatus of the present invention comprises an adjustable frame that supports a manifold 1 having a curved surface 3 on which are mounted a set of nozzles 4 that face one side of a glass sheet V that is to be tempered. Similarly, on the other side of the glass sheet but not shown in the drawing, an identical adjustable frame supports another manifold with a curved surface bearing a second set of nozzles directed at the other side of the glass sheet.

Surface 3 is curved to conform to the spatial configuration of the glass sheet to be tempered and nozzles 4 are distributed substantially uniformly over this surface so that jets of air from the nozzles uniformly cover the surface of the glass sheet to be tempered. Manifold 1 also includes an air intake 2 through which a suitable cooling medium such as air enters the manifold.

Manifold 1 is mounted on a rigid carrier frame 5 by four independently adjustable screw jacks 6, only two of which are shown in the drawing. Thus, the orientation of surface 3 of the manifold can be adjusted relative to the angle of inclination of the surface of glass sheet V by adjustment of the screw jacks. Carrier frame 5 is suspended from bogies 8 which can be moved on two parallel bars 7 extending from spaced uprights 17. As shown in the drawing, bogies 8 are wheeled carriages that ride along parallel tracks on the surfaces of bars 7.

Bars 7 are attached to spaced uprights 17 so as to enable the bars 7 to oscillate vertically when excited by an oscillation means (not shown). As a result of such oscillation, the blasts from nozzles 4 on manifold 3 sweep across the entire surface of the glass sheet being tempered so as to improve the uniformity of tempering.

The position of carrier frame 5 on bars 7 is controlled by four rotatable rods 9 that are connected to pivots on the carrier frame. The other end of each rod is connected to a crank 10 that revolves on shaft 11 in a bearing 12. Shafts 11 in each of the four bearings 12 are rotated in unison by brake reducing gear 14 acting through racks 15. When gear 14 rotates shafts 11, cranks 10 turn, thereby causing rods 9 to displace bogies 8 along the length of the horizontal bars 7. This permits each manifold 1 to be simply and quickly moved a distance of about 0.5 meters to facilitate insertion or removal of glass sheet V between the two manifolds without disrupting other adjustments previously made to the orientation of the manifold.

Bearings 12 are mounted on a movable chassis 13 suspended vertically from carriages on a pair of horizontal track rails 16, only one of which is shown. Each of the carriages includes wheels 18 that permit the carriage to be moved along the length of a track on a surface of rail 16. The horizontal position of chassis 13 is controlled by four screw jacks 19 that are driven in unison by a brake reducing gear 20 mounted on uprights 17.

To temper a sheet of glass using this apparatus, a sheet of glass is mounted between two opposed adjustable frames and manifolds. To position the glass between the two manifolds, each carrier frame 5 and manifold 1 is moved backwards on bars 7 from the tempering position by rotating cranks 10. When the glass sheet is positioned between the two manifolds, the manifolds are returned to their tempering position near the surface of the glass by rotating cranks 10 to their original positions.

The orientation of curved surface 3 and nozzles 4 with respect to the surface of glass sheet V may be adjusted by turning screw jacks 6. These jacks move manifold 1 and therefor curved surface 3 and nozzles 4 relative to carrier frame 5. By varying the displacement of the individual screw jacks, it is possible to vary the orientation of the curved surface and nozzles so that such orientation better conforms to the surface of the glass to be quenched.

Fine adjustments in the spacing between the nozzles and the surface of glass sheet V are advantageously made by adjusting the position of movable chassis 13 relative to uprights 17 by means of screw jacks 19. Chassis 13 controls the position of carrier frame 5 by means of cranks 10 and rods 9. Hence, when the cranks and rods are fully extended, the position of bearings 12 determines the precise spacing between nozzles 4 and the surface of the glass to be tempered. Because screw jacks 19 operate in unison it will be appreciated that they make only a horizontal change in the position of nozzles 4 relative to glass sheet V.

In practice, the foregoing adjustments of orientation and spacing are ordinarily made in advance of a production run of a multitude of glass sheets having the same shape. However, as a result of this arrangement, differences in the angle of inclination of the glass sheets can be accommodated by adjusting the orientation of surface 3 so that the nozzles are uniformly spaced from the sheet; and differences in thickness of the glass sheets can readily be accommodated by adjusting the displacement of screw jacks 19 to alter the spacing between the nozzles and the sheet.

Once the above adjustments have been made, the air supply is turned on and the air is imparted to the surface of the glass under pressure through the elongated nozzles 4. At the same time, the horizontal bars 7 and hence the nozzles are oscillated by an oscillation means (not shown) so that the nozzles sweep across the entire major surfaces of the glass sheet in a manner that improves the uniformity of temper developed in the glass sheet.

Upon completion of the tempering operation, manifolds 1 are again displaced along the length of the bars 7 by gear 14, crank 10, and rotable rods 9 to a position near the mobile chassis so that the tempered glass sheet can be easily removed from the apparatus. A new sheet of untempered glass is then inserted between the manifolds and another glass tempering process can begin.

If desired, the apparatus may readily be modified to permit simultaneous tempering of several sheets of glass as described in European Patent No. 0002055, which is incorporated herein by reference. In such instance the nozzles on the manifold should be grouped into several different blowing zones, each of which is designed to temper one sheet of glass. Pipes should be provided between the blowing zones for evacuation of excess air.

As will be apparent to those skilled in the art, numerous modifications may be made within the spirit and scope of the invention described above.

I claim:

1. Apparatus for tempering glass sheets suspended in a vertical orientation comprising:
   a manifold into which a fluid is introduced and from which a fluid is directed at a glass sheet to temper it,
   a frame on which the manifold is mounted,
   first means for varying the orientation of the manifold relative to the glass sheet by tilting the position of the manifold relative to the frame,
   second means for repetitively moving the frame and therefore the manifold horizontally toward and away from a desired position at which the glass sheet is tempered, and
   third means for adjusting the horizontal position of the frame, said second repetitively moving means being mounted on said third means so that adjustment of said third means changes the position at which the manifold is located when the glass sheet is tempered.

2. The apparatus of claim 1 wherein the frame is mounted on a carriage supported on a track and the moving means comprises a plurality of rods and cranks that are driven in unison to move the frame and carriage on said track.

3. The apparatus of claim 2 wherein the cranks turn on shafts and the adjusting means comprises screw jacks for altering the position of the shafts in the horizontal direction and means for driving the screw jacks in unison, whereby a change in the displacement of the screw jacks alters the horizontal position of the moving means and therefore changes the position at which the manifold is located when the glass sheet is tempered.

4. The apparatus of claim 2 further comprising means to oscillate the track on which the carriage is supported whereby the manifold is oscillated to vary the points from which fluid is directed at the glass sheet to be tempered.

5. The apparatus of claim 1 wherein the frame is mounted on a first carriage supported for movement on a first track and the moving means is mounted on a second carriage supported for movement on a track and the adjusting means comprises a plurality of screw jacks and means for driving said jacks in unison whereby a change in the displacement of the screw jacks alters the position of the second carriage on said track and therefore changes the position at which the manifold is located when the glass sheet is tempered.

6. The apparatus of claim 1 wherein the varying means are a plurality of screw jacks that mount the manifold on said frame.

7. The apparatus of claim 6 wherein at least four screw jacks are used to mount the manifold on the frame.

8. In combination, two apparatuses of claim 1, the manifolds of such apparatuses being mounted so as to direct fluid at opposite sides of said glass sheet.

* * * * *